(12) United States Patent
Kikuchi

(10) Patent No.: US 8,405,738 B2
(45) Date of Patent: Mar. 26, 2013

(54) IMAGE PICKUP APPARATUS AND METHOD OF PICKING UP IMAGE

(75) Inventor: Sunao Kikuchi, Tokyo (JP)

(73) Assignee: Olympus Corporation, Tokyo (JP)

( * ) Notice: Subject to any disclaimer, the term of this patent is extended or adjusted under 35 U.S.C. 154(b) by 294 days.

(21) Appl. No.: 12/970,263

(22) Filed: Dec. 16, 2010

(65) Prior Publication Data

US 2011/0149095 A1    Jun. 23, 2011

(30) Foreign Application Priority Data

Dec. 22, 2009   (JP) .................................. 2009-290381

(51) Int. Cl.
*H04N 5/235* (2006.01)
(52) U.S. Cl. ..................................... 348/229.1; 348/362
(58) Field of Classification Search ............... 348/222.1, 348/229.1, 362
See application file for complete search history.

(56) References Cited

FOREIGN PATENT DOCUMENTS

JP    2008-118389    5/2008

*Primary Examiner* — Gevell Selby
(74) *Attorney, Agent, or Firm* — Scully Scott Murphy & Presser, PC

(57) ABSTRACT

An image pickup apparatus is configured to include an image pickup possibility determination unit to permit a pickup of an image at an exposure when a shutter speed corresponding to that exposure is determined to be equal to or higher than a threshold value, an image pickup setting unit to set the number of images to be picked up at the exposure at which image pickup has been permitted in such a manner that the total number of images that have to be picked up to generate an image signal having a wide dynamic range using image signals obtained at the exposure at which image pickup has been permitted is minimum, a serial image pickup control unit to obtain the number of images set, and an image signal synthesis unit to synthesize the plurality of image signals obtained so as to generate an image signal having a wide dynamic range.

9 Claims, 10 Drawing Sheets

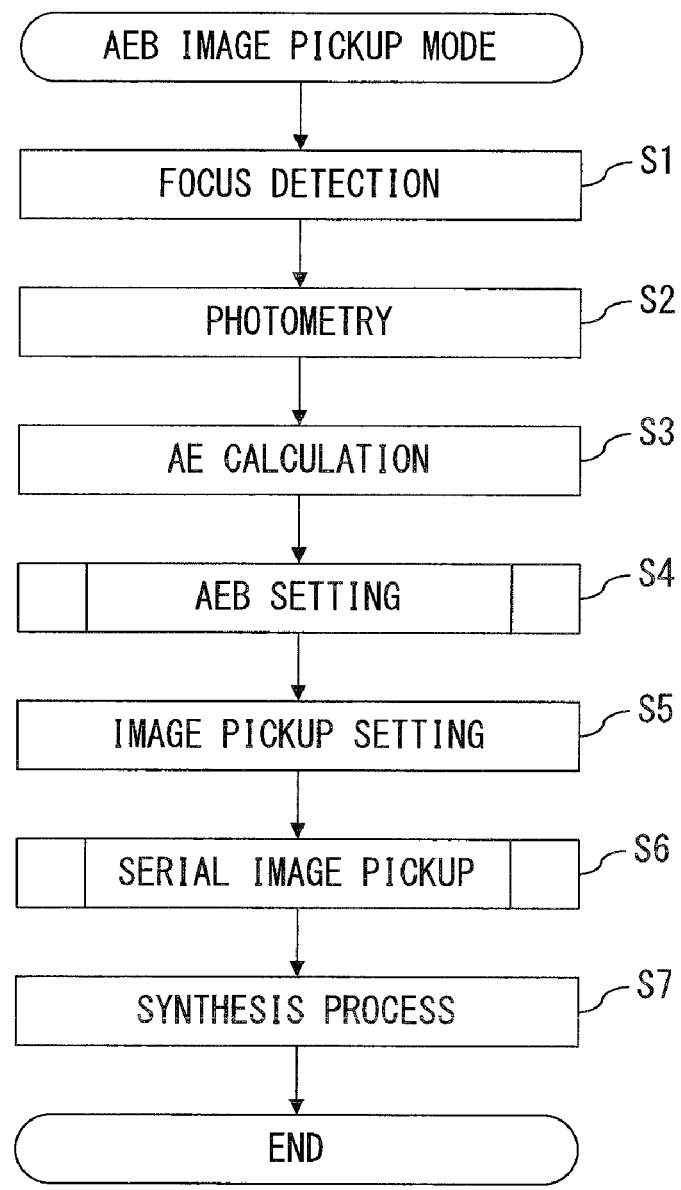
F I G. 2

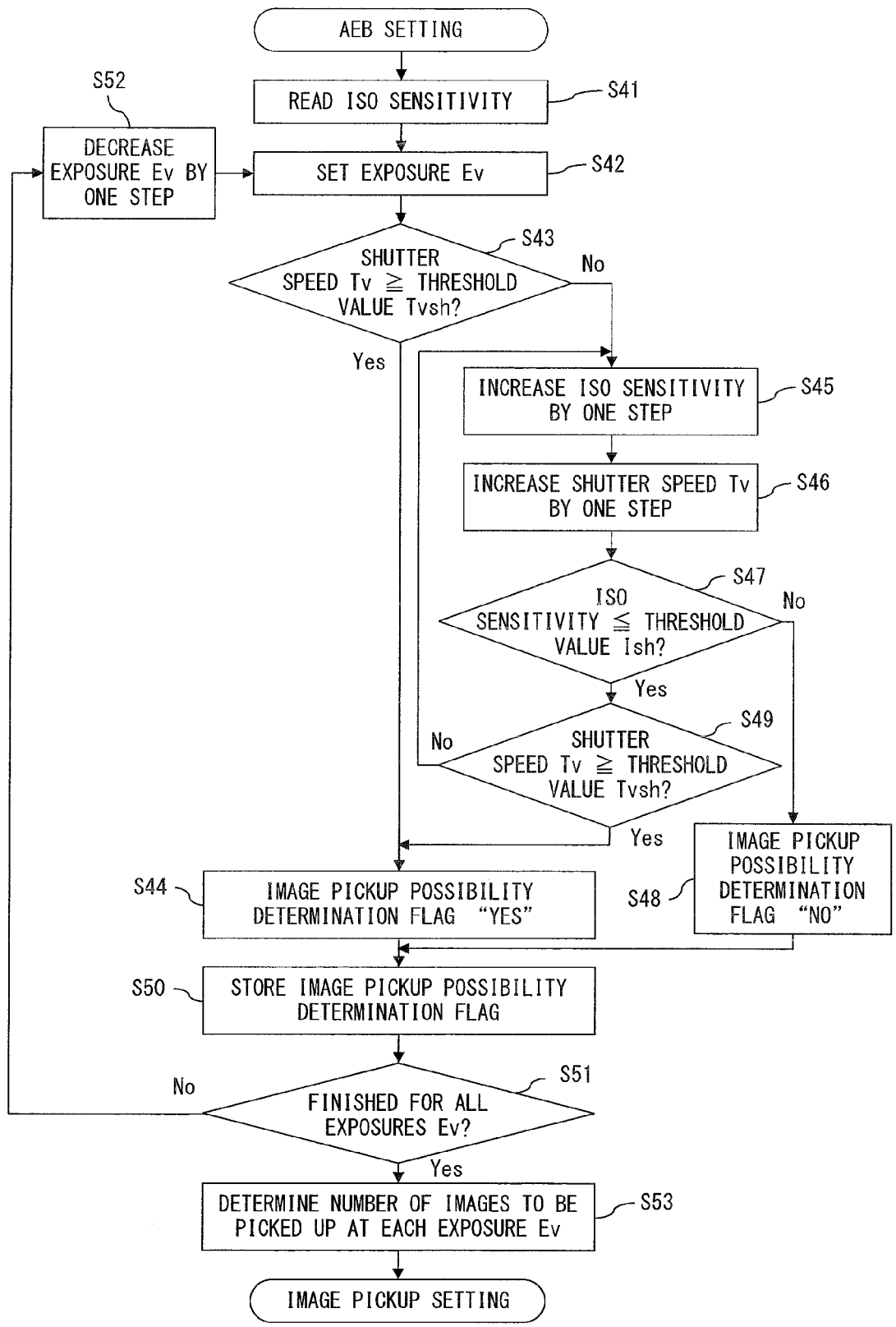
F I G. 3

| EXPOSURE Ev | IMAGE PICKUP POSSIBILITY DETERMINATION FLAG | | |
|---|---|---|---|
| | PATTER 1 | PATTERN 2 | PATTERN 3 |
| Ev_over | ○ (YES) | × (NO) | × (NO) |
| Ev_0 | ○ (YES) | ○ (YES) | × (NO) |
| Ev_under | ○ (YES) | ○ (YES) | ○ (YES) |

F I G. 4 A

| EXPOSURE Ev | NUMBER OF IMAGES TO BE PICKED UP | | |
|---|---|---|---|
| | PATTER 1 | PATTERN 2 | PATTERN 3 |
| Ev_over | 1 | 0 | 0 |
| Ev_0 | 1 | 3 | 0 |
| Ev_under | 1 | 1 | 7 |

F I G. 4 B

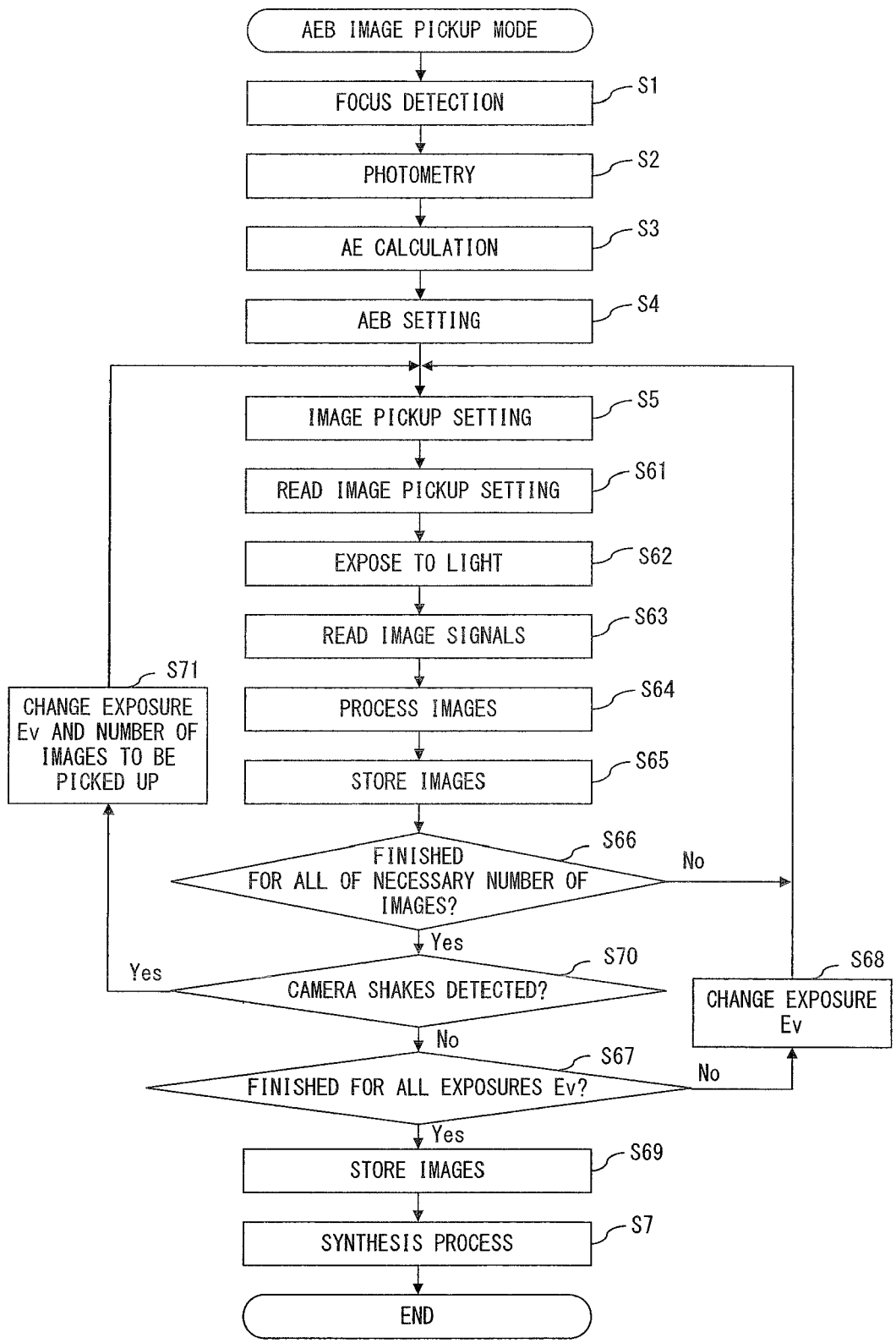
F I G. 7

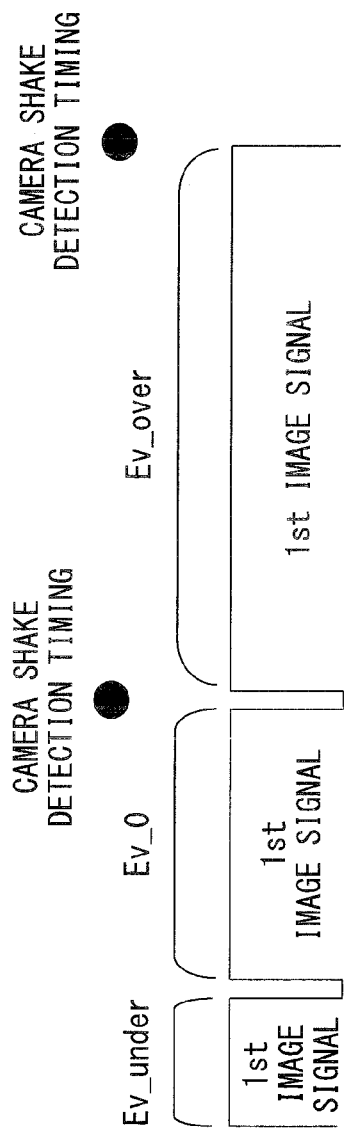
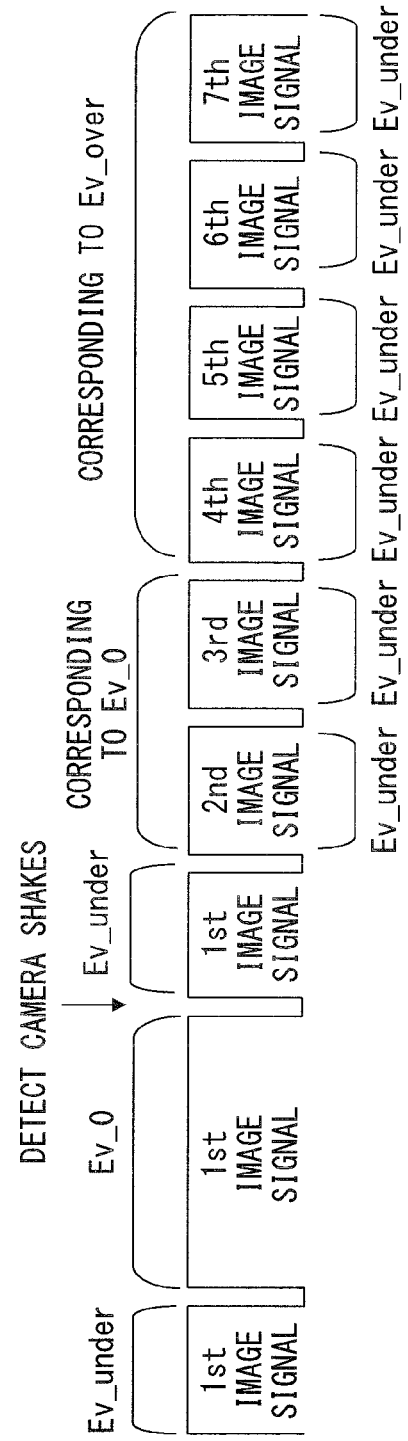
FIG. 8A
FIG. 8B

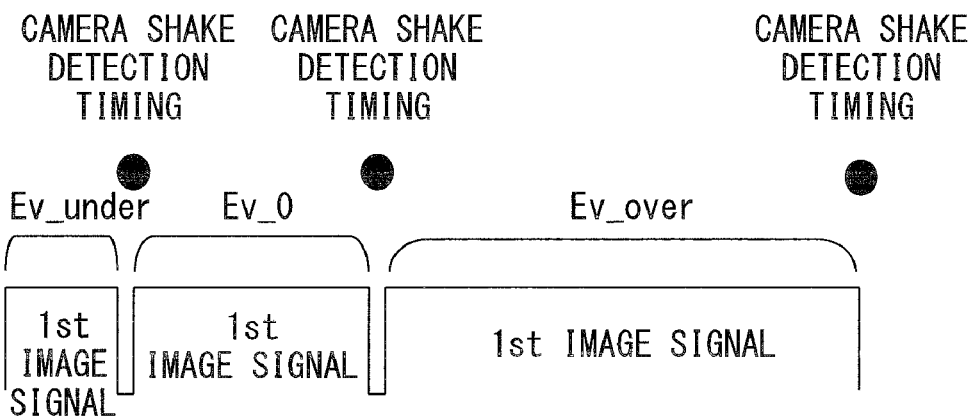
F I G. 1 0

IMAGE PICKUP APPARATUS AND METHOD OF PICKING UP IMAGE

CROSS REFERENCE TO RELATED APPLICATIONS

This application is based upon and claims the benefit of priority from prior Japanese Patent Application No. 2009-290381, filed Dec. 22, 2009, the entire contents of which are incorporated herein by reference.

FIELD

The present invention relates to an image pickup apparatus and a method of picking up images for obtaining an image signal having a wide dynamic range by synthesizing a plurality of image signals with different exposures.

BACKGROUND

Various types of solid-state image sensing devices such as CCD image sensors, CMOS-type image sensors, or the like used generally for electron cameras have narrower dynamic ranges than those of subjects to be shot, which is problematic. This has sometimes caused highlight clipping in high brightness regions and shadow clipping in low brightness regions. In view of this problem, a method is proposed in which a plurality of image signals with different exposures are obtained by bracketing, and an image signal for one image having a wide dynamic range is generated by synthesizing those image signals. For example, an image signal having a wide dynamic range is generated by obtaining and synthesizing three image signals with different exposures: an image signal obtained at the center exposure; an image signal obtained at the exposure one step higher than the center exposure; and an image signal obtained at the exposure one step lower than the center exposure.

However, there has been a problem in which the resultant synthesized image signal involves artifacts such as double images or the like because of camera shaking occurring when a plurality of image signals are picked up.

In view of this, as a method of performing bracketing so as to avoid camera shaking, there is a method in which a plurality of image signals are obtained using underexposure, which permits higher shutter speed, and three image signals with different exposures are obtained by synthesizing different numbers of image signals (See Patent Document 1). By further synthesizing the three image signals obtained by bracketing, an image signal having a wide dynamic range is generated. In such a case, three image signals with different exposures can be obtained while avoiding camera shaking, making it possible to prevent artifacts such as double images or the like from occurring in the resultant synthesized image signal.

Patent Document 1: Japanese Laid-open Patent Publication No. 2008-118389

SUMMARY

An image pickup apparatus according to the present invention is an image pickup apparatus that synthesizes a plurality of images with different exposures and that are obtained through bracketing, and generates an image signal having a wide dynamic range, comprising an exposure calculation unit to calculate a plurality of exposures necessary for bracketing on the basis of shutter speeds, an image pickup possibility determination unit to determine whether or not respective shutter speeds corresponding to the plurality of exposures calculated by the exposure calculation unit are equal to or higher than a first threshold value, and permits pickup of an image at an exposure when a shutter speed corresponding to that exposure is determined to be equal to or higher than the first threshold value, an image pickup setting unit to set the number of images to be picked up at the exposure at which image pickup has been permitted by the image pickup possibility determination unit in such a manner that the total number of images that have to be picked up to generate the image signal having a wide dynamic range using image signals obtained at the exposure at which image pickup has been permitted by the image pickup possibility determination unit is a minimum, an image obtainment unit to obtain the number of image signals set by the image pickup setting unit, and an image signal synthesis unit to synthesize the plurality of image signals obtained by the image obtainment unit so as to generate the image signal having a wide dynamic range.

BRIEF DESCRIPTION OF THE DRAWINGS

FIG. 2 shows a flowchart for explaining operations of the image pickup apparatus in "AEB IMAGE PICKUP MODE";

FIG. 3 shows a flowchart for explaining operations of "AEB setting";

FIG. 4A shows an example of an LUT;

FIG. 4B shows another example of an LUT;

FIG. 7 shows operations of the image pickup apparatus in "AEB IMAGE PICKUP MODE" according to another embodiment of the present invention;

FIG. 8A shows camera shake detection timings according to another embodiment of the present invention;

FIG. 8B shows operations of changing an exposure and the number of images to be picked up when camera shaking has been detected;

FIG. 10 shows operations of changing an exposure and the number of images to be picked up when camera shaking has been detected.

DETAILED DESCRIPTION OF INVENTION

Figure 1:
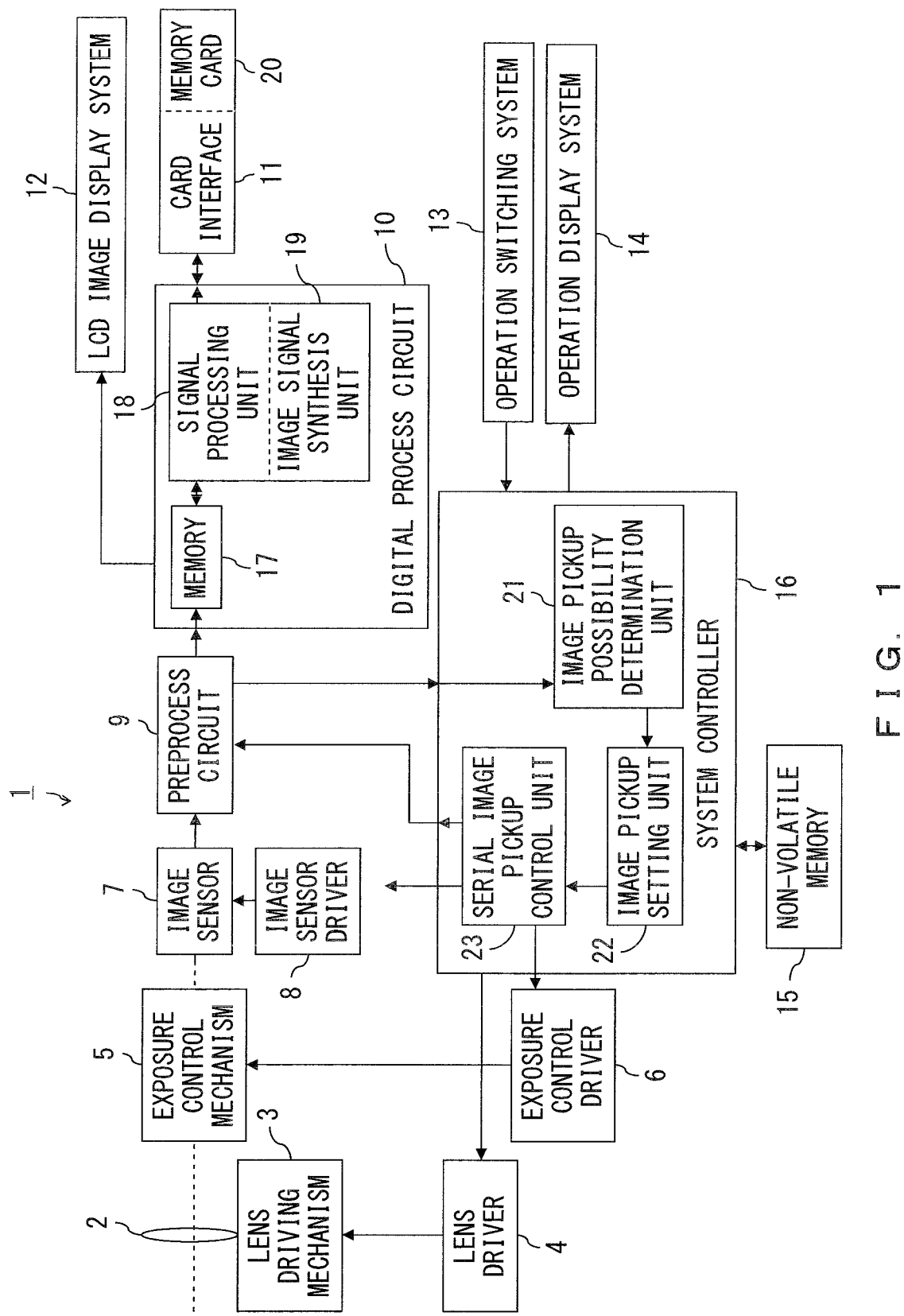
FIG. 1 shows an image pickup apparatus according to an embodiment of the present invention.

FIG. 1 shows an image pickup apparatus according to an embodiment of the present invention.

An image pickup apparatus 1 shown in FIG. 1 includes an image pickup lens system 2, a lens driving mechanism 3, a lens driver 4, an exposure control mechanism 5, an exposure control driver 6, an image sensor 7 (image sensing device), an image sensor driver 8, a preprocess circuit 9, a digital process circuit 10, a card interface 11, an LCD image display system 12, an operation switching system 13, an operation display system 14, non-volatile memory 15, and a system controller 16.

The image pickup lens system 2 includes various types of lenses such as a zoom lens, a focus lens, and the like.

The lens driving mechanism 3 drives respective lenses of the image pickup lens system (expanding and retracting of a zoom lens, adjusting focus of a focus lens, or the like).

The lens driver 4 controls operations of the lens driving mechanism 3 in accordance with control signals transferred from a system controller 16.

The exposure control mechanism 5 controls the diameter of the diaphragm and the shutter speed.

The exposure control driver 6 controls operations of the exposure control mechanism 5 in accordance with control signals (for example, a Tv control value for controlling the shutter speed) transferred from the system controller 16.

The image sensor 7 includes a color filter, and performs photoelectric conversion on the subject images.

The image sensor driver 8 controls the driving of the image sensor 7.

The preprocess circuit 9 includes an analog amplifier, an A/D converter, and the like so as to control, on the basis of an ISO sensitivity control value transferred from the system controller 16, the level of photoelectrically converted image signals, and thereafter to convert the signals into digital data using the A/D converter.

The digital process circuit 10 includes memory 17, a signal processing unit 18, and an image signal synthesis unit 19. The memory 17 stores image signals that have been converted into digital data by the preprocess circuit 9. The signal processing unit 18 performs a color signal generation process, a matrix conversion process, a compand process, and other various digital processes on the image signals stored in the memory 17, and generates image signals to be recorded. The image signal synthesis unit 19 generates an image signal having a wide dynamic range by synthesizing the plurality of image signals generated by the signal processing unit 18.

The card interface 11 is an interface with a memory card 20 as an external storage medium.

The LCD image display system 12 displays image signals generated by the digital process circuit 10.

The operation switching system 13 includes various switches such as a release button, a setting button, and the like.

The operation display system 14 displays the current state of operations performed by the user on the image pickup apparatus 1, an image-pickup mode, or the like.

The non-volatile memory 15 includes EEPROM, or the like, and stores various setting values set through the system controller 16.

The system controller 16 includes a CPU and the like, and controls the entirety of the operations of the above described units. For example, when the release button is pressed halfway in after the user has operated various switches of the operation switching system 13 and the image pickup conditions such as the ISO sensitivity of the image sensor 7, the exposure compensation value, and the like are set, the system controller 16 enters the "Pre pickup mode". The system controller 16 that has entered the "Pre pickup mode" controls the respective operations of the lens driver 4, the exposure control driver 6, and the image sensor driver 8 so as to expose the image sensor 7 to light (charge accumulation), and reads from the image sensor 7 image signals that have been subjected to photoelectric conversion. Next, the system controller 16 performs, in the digital process circuit 10, various signal processes on the image signals that have been converted into digital data, and transfers the resultant data to the LCD image display system 12. When the release button is pressed fully by the user, the system controller 16 enters the "Image pickup mode", and stores, in the memory card 20 and via the card interface 11, the image signals output from the digital process circuit 10.

The system controller 16 includes an image pickup possibility determination unit 21, an image pickup setting unit 22, and a serial image pickup control unit 23. In addition to the above described "Pre pickup mode" and "Image pickup mode", the system controller 16 performs the "Auto Exposure Bracketing Mode" (hereinafter, referred to as AEB), which is a feature of the present embodiment.

On the basis of results of comparisons between shutter speed Tv and threshold value Tvsh and between the ISO sensitivity and threshold value Ish, the image pickup possibility determination unit 21 determines whether or not images can be picked up each at plural values of exposure Ev that are set in the "AEB IMAGE PICKUP MODE".

The image pickup setting unit 22 stores, in the non-volatile memory 15, various setting values such as the above plural values of exposure Ev, shutter speeds Tv that respectively correspond to the plural values of exposure Ev, the ISO sensitivities that respectively correspond to the plural values of exposure Ev, and the numbers of images to be picked up that respectively correspond to the plural values of exposure Ev.

The serial image pickup control unit 23 controls operations respectively of the lens driver 4, the exposure control driver 6, and the image sensor driver 8 on the basis of various setting values stored in the non-volatile memory 15, and obtains a plurality of image signals to be used for generating an image signal having a wide dynamic range.

Next, operations of the image pickup apparatus 1 in the "AEB image pickup mode" will be explained.

FIG. 2 shows a flowchart for explaining operations of the image pickup apparatus 1 in the "AEB image pickup mode".

First, the release button is pressed fully after the user has selected the "AEB image pickup mode". Then, the system controller 16 obtains the contrast value in the AF area in the image signal from the preprocess circuit 9, and thereafter detects the focal position (S1) by controlling operations of the lens driving mechanism 3 in such a manner that this contrast value becomes the maximum. In addition, it is also possible to use an infrared sensor (not shown) to measure the distance between the image pickup apparatus 1 and the subject and to detect the focal position by controlling operations of the lens driving mechanism 3 in accordance with the measured distance.

Next, the system controller 16 conducts photometry (S2) using the luminance level in the image signal and a luminance sensor (not shown)

Next, the system controller 16 calculates plural values of exposure Ev that are necessary for bracketing (S3) on the basis of the luminance of the subject obtained through the photometry and of the ISO sensitivity and exposure compensation value set beforehand by the user. For example, the system controller 16 calculates exposure Ev_0 on the basis of the subject luminance, the ISO sensitivity, and the exposure compensation value, and thereafter calculates exposure Ev_over (=Ev_0+Ev_step), which is one step higher than exposure Ev_0, and exposure Ev_under (=Ev_0−Ev_step), which is one step lower than exposure Ev_0. Ev_step is an arbitrary value that is set beforehand.

Next, the image pickup possibility determination unit 21 in the system controller 16 determines whether or not image pickup is possible at respective exposures Ev_over, Ev_0, and Ev_under on the basis of the result of comparison between shutter speed Tv and threshold value Tvsh and between the ISO sensitivity and threshold value Ish, and sets the numbers of images to be picked up at respective exposures Ev_over, Ev_0, and Ev_under on the basis of the determination result of whether or not each image pickup is possible (S4).

Next, the image pickup setting unit 22 in the system controller 16 stores, in the non-volatile memory 15, various setting values (S5) (exposures Ev_over, Ev_0, and Ev_under, shutter speeds Tv that respectively correspond to exposures Ev_over, Ev_0, and Ev_under, the ISO sensitivities that respectively correspond to exposures Ev_over, Ev_0, and Ev_under, and the numbers of images to be picked up that respectively correspond to exposures Ev_over, Ev_0, and Ev_under).

Next, the serial image pickup control unit 23 in the system controller 16 controls operations respectively of the lens driver 4, the exposure control driver 6, and the image sensor driver 8 on the basis of various setting values stored in the non-volatile memory 15, and obtains a plurality of image signals (S6) necessary for generating an image signal having a wide dynamic range.

Then, the signal processing unit 18 performs various signal processes on the plurality of image signals obtained in S6, and the image signal synthesis unit 19 performs position adjustment processes on the respective image signals that have been subjected to the signal processes, and thereafter the signals are synthesized (S7) to generate an image signal having a wide dynamic range. The image signal after the synthesis is stored in the memory card 20 via the card interface 11.

FIG. 3 shows a flowchart for explaining operations performed in the above described S4 (AEB setting).

First, the image pickup possibility determination unit 21 reads the ISO sensitivity set beforehand by the user (S41).

Next, the image pickup possibility determination unit 21 sets exposure Ev (S42). It is assumed that exposure Ev_over is set in the initial state from among exposures Ev_over, Ev_0, and Ev_under calculated in S3 in FIG. 2.

Next, the image pickup possibility determination unit 21 determines whether or not shutter speed Tv is higher than threshold value Tvsh (S43). Threshold value Tvsh is the slowest shutter speed Tv that does not cause camera shaking, and is, for example, a value calculated by 1/focal length.

When shutter speed Tv is determined to be equal to or higher than threshold value Tvsh, i.e., when camera shaking is determined to not have occurred (Yes in S43), the image pickup possibility determination unit 21 sets an image pickup possibility determination flag "OK" (S44), which means that image pickup is possible at exposure Ev set in S42.

When shutter speed Tv is determined to not be equal to or higher than threshold value Tvsh, i.e., when camera shaking is determined to have occurred (No in S43), the image pickup possibility determination unit 21 increases the ISO sensitivity by one step (S45), and also increases shutter speed Tv by one step (S46).

Next, the image pickup possibility determination unit 21 determines whether or not the ISO sensitivity is equal to or lower than threshold value Ish (S47). Threshold value Ish is the highest ISO sensitivity that permits the obtainment of image signals with reduced noise.

When the ISO sensitivity is determined to not be equal to or lower than threshold value Ish, i.e., when it is determined that image signals with reduced noise cannot be obtained (No in S47), the image pickup possibility determination unit 21 sets an image pickup possibility determination flag "NO" (S48), which means that image pickup is impossible at exposure Ev set in S42.

When the ISO sensitivity is determined to be equal to or lower than threshold value Ish, i.e., when it is determined that image signals with reduced noise can be obtained (Yes in S47), the image pickup possibility determination unit 21 determines whether or not shutter speed Tv is equal to or higher than threshold value Tvsh (S49).

When shutter speed Tv is determined to be equal to or higher than threshold value Tvsh (Yes in S49), the image pickup possibility determination unit 21 proceeds to S44.

When shutter speed Tv is determined to not be equal to or higher than threshold value Tvsh (No in S49), the image pickup possibility determination unit 21 returns to S45.

Also, the image pickup possibility determination unit 21 stores (S50) the image pickup possibility determination flag meaning that image pickup is possible at exposure Ev set in S42 (S44) or the image pickup possibility determination flag meaning that image pickup at exposure ev set in S42 is impossible (S48).

Next, the image pickup possibility determination unit 21 determines whether or not the image pickup possibility determination flag has been stored for each of the exposures Ev_over, Ev_0, and Ev_under (S51).

When it is determined that the image pickup possibility determination flag has not been stored for each of the exposures Ev_over, Ev_0, and Ev_under (No, in S51), the image pickup possibility determination unit 21 switches the exposure from exposure Ev to the exposure one step lower than Ev (S52), and returns to S42. For example, when current exposure Ev is exposure Ev_over, the exposure is switched to exposure Ev_0, and when current exposure Ev is exposure Ev_0, the exposure is switched to exposure Ev_under.

When it is determined that the image pickup possibility determination flag has been stored for each of the exposures Ev_over, Ev_0, and Ev_under (Yes in S51), the image pickup possibility determination unit 21 determines the number of images to be picked up at each of the exposures Ev_over, Ev_0, and Ev_under on the basis of combinations (patterns) of the image pickup possibility determination flags respectively corresponding to exposures Ev_over, Ev_0, and Ev_under (S53). It is also possible for the image pickup possibility determination unit 21, for example, to obtain the patterns of the types of the image-pickup possibility determination flags respectively corresponding to exposures Ev_over, Ev_0, and Ev_under by using the LUT (Look Up Table) shown in FIG. 4A, and thereafter to obtain the number of images to be picked up at each of the exposures Ev_over, Ev_0, and Ev_under that correspond to the pattern by using the LUT shown in FIG. 4B. Each number of images to be picked up shown in FIG. 4B is the minimum number of images "n" that is required at each exposure Ev in order to generate an image signal having a wide dynamic range, and is expressed by $n=2^{\Delta Ev}$, where $\Delta Ev$ represents the magnitude of one step of exposure Ev (Ev_step).

For example, in the example shown in FIGS. 4A and 4B, the pattern of the type of the image pickup possibility determination flag is "Pattern 1" when the image pickup possibility determination flag for exposure Ev_over is "YES", the image pickup possibility determination flag for exposure Ev_0 is "YES", and the image pickup possibility determination flag for exposure Ev_under is "YES". The number of images to be picked up at exposure Ev_over corresponding to "Pattern 1" is "1", and the number of images to be picked up at exposure Ev_0 corresponding to "Pattern 1" is "1", and the number of images to be picked up at exposure Ev_under corresponding to "Pattern 1" is "1".

Also, when, for example, the image pickup possibility determination flag for exposure Ev_over is "NO", the image pickup possibility determination flag for exposure Ev_0 is "YES", and the image pickup possibility determination flag for exposure Ev_under is "YES", the pattern of the type of the image pickup possibility determination flag is "Pattern 2". The number of images to be picked up at exposure Ev_over corresponding to "Pattern 2" is "ZERO", the number of images to be picked up at exposure Ev_0 corresponding to "Pattern 2" is "3", and the number of images to be picked up at exposure Ev_under corresponding to "Pattern 2" is "1". In this case, among the three image signals obtained at exposure Ev_0, two image signals are used and synthesized as image signals obtained at exposure Ev_over.

Also, when, for example, the image pickup possibility determination flag for exposure Ev_over is "NO", the image pickup possibility determination flag for exposure Ev_0 is "NO", and the image pickup possibility determination flag for exposure Ev_under is "YES", the pattern of the type of the image pickup possibility determination flag is "Pattern 3". The number of images to be picked up at exposure Ev_over corresponding to "Pattern 3" is "ZERO", the number of images to be picked up at exposure Ev_0 corresponding to "Pattern 3" is "ZERO", and the number of images to be picked up at exposure Ev_under corresponding to "Pattern 3" is "7". In this case, among the seven image signals obtained at exposure Ev_0, two image signals are used and synthesized as image signals obtained at exposure Ev_0, and four image signals are used and synthesized as image signals obtained at exposure Ev_over.

As described above, when shutter speed Tv is a shutter speed that does not cause camera shaking, the number of images to be picked up at higher exposure (exposure Ev_over or exposure Ev_0) is increased on the basis of the LUTs shown in FIGS. 4A and 4B, making it possible to reduce, by as much as that increase, the number of images to be picked up at a lower exposure (exposure Ev_under). Thereby, the total number of image signals necessary for synthesis can be reduced.

In the flowchart shown in FIG. 3, the image pickup possibility determinations are performed in the order of exposures Ev_over, Ev_0, and Ev_under. However, the image pickup possibility determinations may also be performed in the order of exposure Ev_under, exposure Ev_0, and exposure Ev_over. This configuration makes it possible to omit the image pickup possibility determinations for exposure Ev_over when the image pickup possibility determination flag for exposure Ev_0 is "NO", and accordingly makes it possible to finish the AEB setting operation earlier than the configuration in which the image pickup possibility determinations are performed in the order of exposures Ev_over, Ev_0, and Ev_under.

Figure 5:
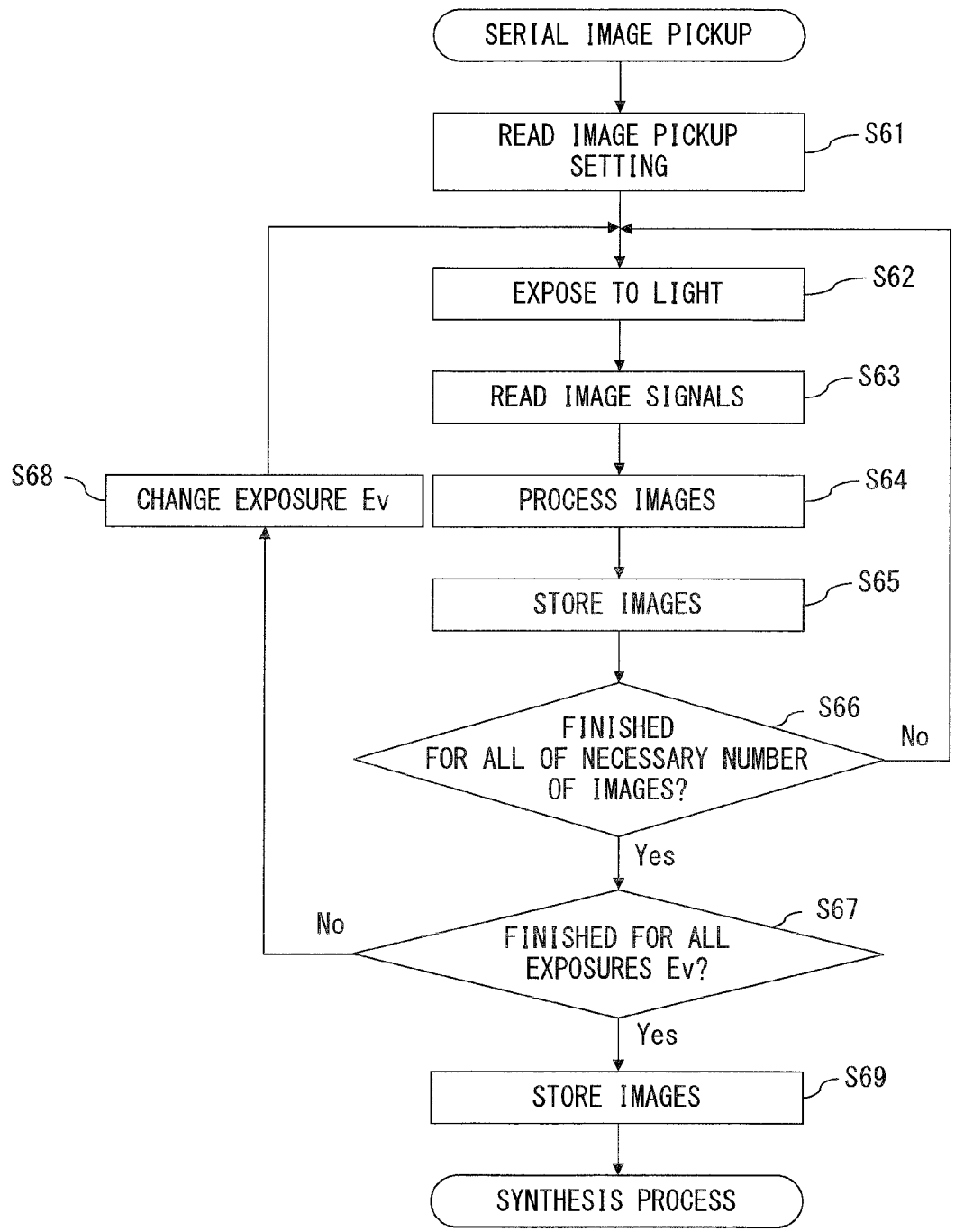
FIG. 5 shows a flowchart for explaining operations of "SERIAL IMAGE PICKUP"

FIG. 5 shows a flowchart for explaining operations of step S6 above (SERIAL IMAGE PICKUP).

First, the serial image pickup control unit 23 reads various setting values stored in the non-volatile memory 15 (S61) (exposures Ev_over, Ev_0, and Ev_under, shutter speeds Tv that respectively correspond to exposures Ev_over, Ev_0, and Ev_under, the ISO sensitivities that respectively correspond to exposures Ev_over, Ev_0, and Ev_under, and the numbers of images to be picked up that respectively correspond to exposures Ev_over, Ev_0, and Ev_under).

Next, the serial image pickup control unit 23 controls operations respectively of the lens driver 4, the exposure control driver 6, and the image sensor driver 8 for each of the exposures Ev_over, Ev_0, and Ev_under, and exposes the image sensor 7 to light (S62). Also, the serial image pickup control unit 23 reads, from the image sensor 7, image signals that have been subjected to photoelectric conversion (S63). Further, the serial image pickup control unit 23 makes the digital process circuit 10 perform various signal processes (S64) on the A/D converted image signals output from the preprocess circuit 9, and stores the resultant signals in the memory 17 temporarily (S65).

Next, the serial image pickup control unit 23 determines whether or not image signals for the necessary number of images to be picked up at certain exposure Ev have been obtained (S66).

When it is determined that image signals for the necessary number of images have not been obtained (No in S66), the serial image pickup control unit 23 performs S62 through S66 again.

When it is determined that image signals for the necessary number of images have been obtained (Yes in S66), the serial image pickup control unit 23 determines whether or not image signals for the necessary numbers of images to be picked up have been obtained at all of the exposures Ev_over, Ev_0, and Ev_under (S67).

When it is determined that the image signals have been obtained at not all of the exposures Ev_over, Ev_0, and Ev_under (No in S67), the serial image pickup control unit 23 changes current exposure Ev to a different exposure Ev (S68), and returns to S62.

When it is determined that image signals for the necessary numbers of images have been obtained at all of exposures Ev_over, Ev_0, and Ev_under (Yes in S67), the serial image pickup control unit 23 stores, in the memory 17 and as image signals to be synthesized, all image signals obtained (S69), and proceeds to the synthesis process in S7 in FIG. 2.

As described above, the image pickup apparatus 1 according to the present embodiment is configured to increase shutter speed Tv by increasing the ISO sensitivity when shutter speed Tv is determined to not be equal to or higher than threshold value Tvsh at a certain exposure Ev in a case when an image signal having a wide dynamic range is to be obtained by synthesizing a plurality of image signals with different exposures. In this configuration, a pickup of images at that exposure Ev can easily be permitted. Thereby, image signals at a high exposure can easily be obtained, and the number of image signals to be obtained at a low exposure can be reduced. This makes it possible to prevent shadow clipping in dark regions while avoiding camera shaking in dark image pickup scenes.

Also, the number of images that have to be picked up for synthesis can be reduced so that the memory area in the memory 17 is less occupied, making it possible to eliminate the risk of an increase in cost.

Also, the ISO sensitivity is increased in order to increase shutter speed Tv; however, when the ISO sensitivity exceeds a threshold value Ish, image pickup at exposure Ev in that condition is prohibited, and accordingly noise included in the image signal after synthesis can be reduced.

Also, camera shaking can be avoided, making the present invention advantageous in telephotography.

Figure 6:
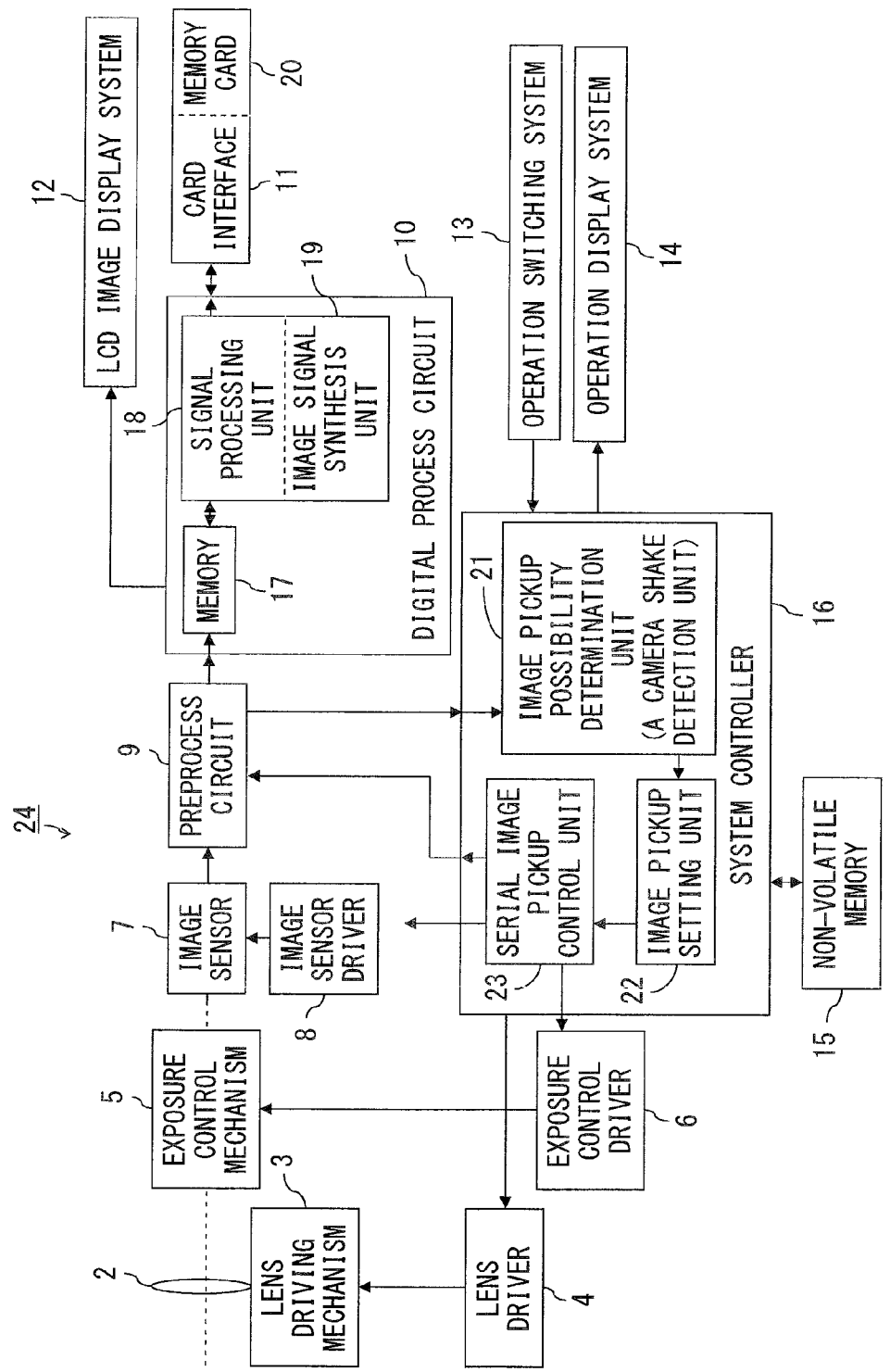
FIG. 6 shows an image pickup apparatus according to another embodiment of the present invention.

FIG. 6 shows an image pickup apparatus according to another embodiment of the present invention. The same components as in the configuration shown in FIG. 1 are denoted by the same numerals.

An image pickup apparatus 24 shown in FIG. 6 is different from the image pickup apparatus 1 shown in FIG. 1 in that the image pickup apparatus 24 performs image pickup possibility determination on the basis of a result of camera shake detection performed by a camera shake detection unit in the image pickup possibility determination unit 21 in the system controller 16, and changes the number of images to be picked up that correspond to exposure Ev. It is to be noted that the image pickup apparatus 24 shown in FIG. 6 performs image pickup possibility determination in the order of exposures Ev_under, Ev_0, and Ev_over.

FIG. 7 shows a flowchart for explaining operations of the system controller 16 when the "AEB pickup mode" is selected in the image pickup apparatus 24. The operations in S1 through S5 and S7 in FIG. 7 are the same as those in S1 through S5 and S7 in FIG. 2. Also, the operations in S61 through S69 in FIG. 7 are the same as those in S61 through S69 in FIG. 5. Further, in S4 (AEB setting) in FIG. 7, the only process performed is to set exposure Ev_over, which is one step higher than the exposure Ev_0 calculated in the AE calculation in S3, and to set exposure Ev_under, which is one step lower than exposure Ev_0, omitting the setting of the number of images to be picked up at each other exposure Ev, which is different from the flowchart shown in FIG. 3.

When it is determined that image signals for the necessary number of images at a certain exposure Ev have been obtained in S66 in FIG. 7 (Yes in S66), the image pickup possibility determination unit 21 performs camera shake detection using a plurality of obtained image signals (S70). As an example of a method of detecting camera shaking, an EXCLUSIVE-OR operation is performed on binary images on the basis of two arbitrary image signals so as to detect regions that are not coincidental between the two images on the basis of the result of the EXCLUSIVE-OR operation, and camera shaking is determined to be occurring when the size of the non-coincidental region is larger than a threshold value. It is also possible to determine a region to be a non-coincidental region when that region has been determined to be non-coincidental for more than a prescribed time period.

When camera shaking is detected (Yes in S70), the system controller 16 makes the image pickup setting unit 22 change the current exposure Ev to an exposure Ev that is one step lower or to an exposure Ev that is more than one step lower. Also, the system controller 16 makes the image pickup setting unit 22 change the number of images to be picked up (S71) so that image signals at exposure Ev_under, Ev_0 and Ev_over can be obtained by using exposure Ev after the above change. Thereafter, the system controller 16 makes the serial image pickup control unit 23 obtain image signals again (S61 through S66).

When camera shaking is not detected (No in s70), the system controller 16 determines whether or not image signals have been obtained at each of exposures Ev_over, Ev_0, and Ev_under (S67). The operations subsequent to this are the same as those described above.

For example, when no camera shaking is detected at the camera shake detection timing after obtaining image signals at exposure Ev_0 and the camera shake detection timing after obtaining image signals at exposure Ev_over as shown in FIG. 8A, one image signal is obtained at each exposure Ev, and these image signals are used to generate an image signal having a wide dynamic range.

Also, when camera shaking is detected at the camera shake detection timing after obtaining image signals at exposure Ev_0 as shown in FIG. 8B, the image pickup setting unit 22 changes current exposure Ev_0 to exposure Ev_under, the number of images to be picked up is changed to seven, and the serial image pickup control unit 23 obtains seven image signals at exposure Ev_under. Then, among these seven image signals, one image signal, two image signals, and four image signals are used for synthesis as image signals at exposures Ev_under, Ev_0, and Ev_over, respectively. In other words, in the example shown in FIG. 8B, seven image signals picked up at exposure Ev_under are used to generate an image signal having a wide dynamic range.

As described above, the image pickup apparatus 24 according to the present embodiment can easily obtain image signals at a high exposure, reducing the number of image signals obtained at a lower exposure until camera shaking is detected. Accordingly, it is possible to prevent shadow clipping in dark scenes while avoiding camera shaking.

Figure 9:
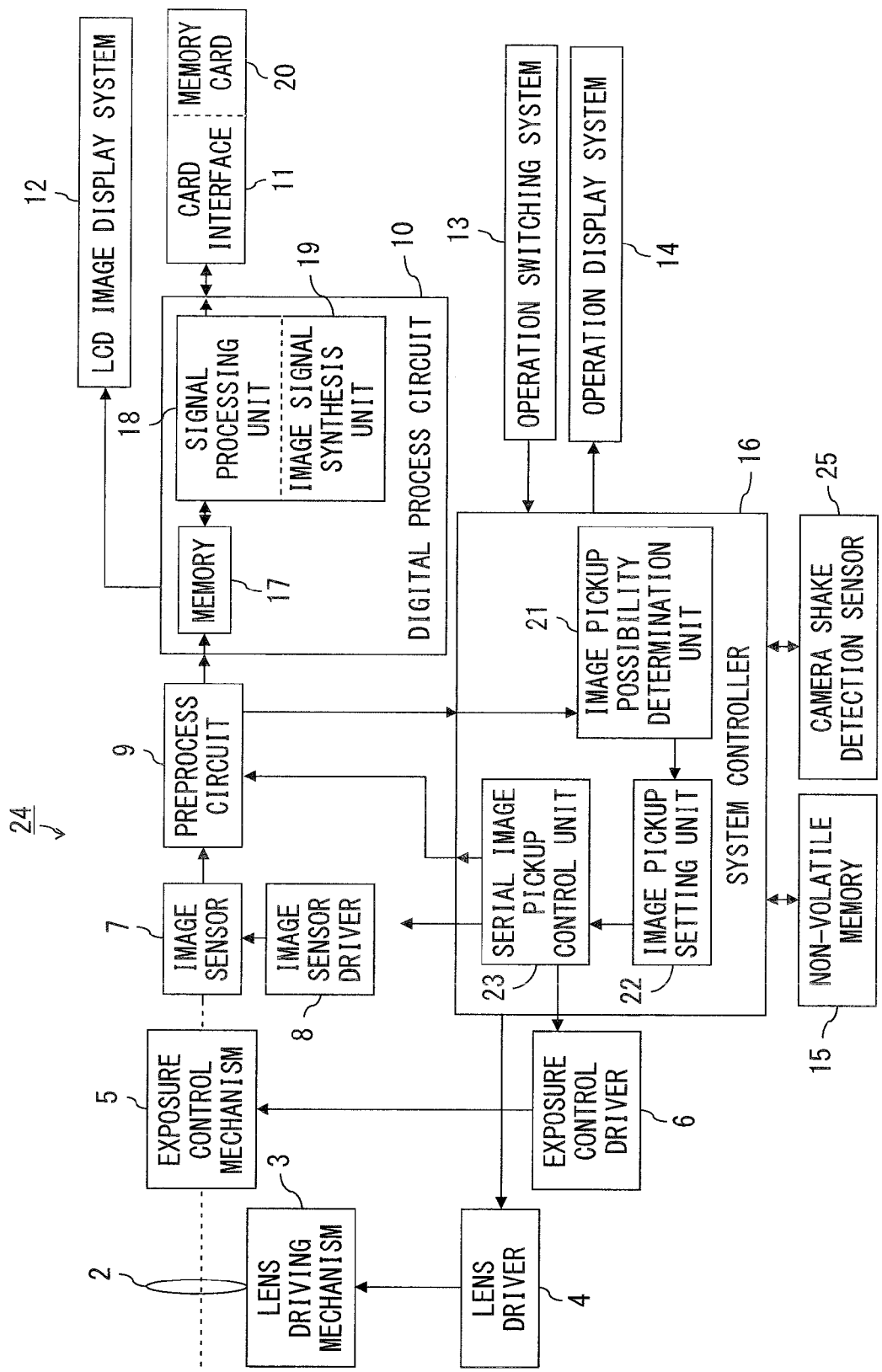
FIG. 9 shows a variation example of an image pickup apparatus according to another embodiment of the present invention.

Also, the image pickup apparatus 24 shown in FIG. 6 employs a configuration in which the camera shake detection unit in the image pickup possibility determination unit 21 in the system controller 16 detects camera shaking in a plurality of image signals. However, similarly to the variation example of the image pickup apparatus 24 shown in FIG. 9, the image pickup apparatus 24 may have, externally from the system controller 16, a camera shake detection sensor 25 such as a gyro sensor or the like to detect the movement of the image pickup apparatus 24. When this configuration is employed, the detection of camera shaking by the camera shake detection sensor 25 makes the image pickup setting unit 22 change current exposure Ev to an exposure Ev that is one step lower or two or more steps lower, and change the number of images to be picked up to a number that allows image signals to be obtained at exposures Ev_under, Ev_0, and Ev_over on the basis of exposure Ev after the change (S71 in FIG. 7), and thereafter, the process returns to S5 in FIG. 7 so that the serial image pickup control unit 23 obtains image signals again (S61 through S66 in FIG. 7).

As described above, when the camera shake detection sensor 25 is provided, camera shaking can be detected immediately after the obtainment of the first image signal so that camera shake detection can be performed even before the second image signal is obtained, as shown in FIG. 10. This makes it possible to obtain image signals at exposures Ev_over, Ev_0, and Ev_under effectively.

In the above respective embodiments, image signals obtained at three values of exposures are synthesized in order to generate an image signal having a wide dynamic range; however, the number of values of exposures used for synthesis is not particularly limited.

According to the present invention it is possible to prevent shadow clipping in dark regions in dark scenes while avoiding camera shaking when a plurality of image signals with different exposures are synthesized in order to generate an image signal having a wide dynamic range.

What is claimed is:

1. An image pickup apparatus that synthesizes a plurality of images with different exposures and that are obtained through bracketing, and generates an image signal having a wide dynamic range, comprising:
   an exposure calculation unit to calculate a plurality of exposures necessary for bracketing on the basis of shutter speeds;
   an image pickup possibility determination unit to determine whether or not respective shutter speeds corresponding to the plurality of exposures calculated by the exposure calculation unit are equal to or higher than a first threshold value, and to permit pickup of an image at an exposure when a shutter speed corresponding to that exposure is determined to be equal to or higher than the first threshold value;
   an image pickup setting unit to set the number of images to be picked up at the exposure at which image pickup has been permitted by the image pickup possibility determination unit in such a manner that the total number of images that have to be picked up to generate the image signal having a wide dynamic range using image signals obtained at the exposure at which image pickup has been permitted by the image pickup possibility determination unit is a minimum;
   an image obtainment unit to obtain the number of image signals set by the image pickup setting unit; and
   an image signal synthesis unit to synthesize the plurality of image signals obtained by the image obtainment unit so as to generate an image signal having a wide dynamic range.

2. The image pickup apparatus according to claim 1, wherein:

an image pickup possibility determination unit increases a sensitivity of an image sensing device and a shutter speed at an exposure when a shutter speed corresponding to the exposure is determined to be not equal to or higher than the first threshold value, and thereafter permits pickup of an image at that exposure when a sensitivity after the change is determined to be equal to or lower than a second threshold value and a shutter speed after the change is equal to or higher than the first threshold value.

3. The image pickup apparatus according to claim 1, wherein:
the first threshold value is a slowest shutter speed that does not cause camera shaking.

4. The image pickup apparatus according to claim 2, wherein:
the second threshold value is a highest sensitivity of the image sensing device that allows obtainment of an image signal with reduced noise.

5. An image pickup apparatus that synthesizes a plurality of images with different exposures and that are obtained through bracketing, and that generates an image signal having a wide dynamic range, comprising:
an exposure calculation unit to calculate a plurality of exposures necessary for bracketing on the basis of shutter speeds;
a number-of-picked-up-images setting unit to set the number of images to be picked up at each of the plurality of exposures calculated by the exposure calculation unit, the setting being done in such a manner that the total number of images that have to be picked up to generate the image signal having a wide dynamic range is a minimum;
an image obtainment unit to obtain the number of images set by the number-of-picked-up-images setting unit starting sequentially from a lowest exposure among the plurality of exposures calculated by the exposure calculation unit;
a camera shake detection unit to detect camera shaking;
an image pickup possibility determination unit to change a current exposure to a lower exposure, to change the number of images to be picked up in such a manner that image signals at each exposure calculated by the exposure calculation unit can be obtained using an exposure after the change, and to make the image obtainment unit obtain image signals again when the camera shake detection unit has detected camera shaking; and
an image signal synthesis unit to synthesize the plurality of image signals obtained by the image obtainment unit so as to generate the image signal having a wide dynamic range.

6. The image pickup apparatus according to claim 5, wherein:
the camera shake detection unit detects camera shaking on the basis of a plurality of obtained image signals.

7. The image pickup apparatus according to claim 5, wherein:
the camera shake detection unit is a sensor that detects movement of the image pickup apparatus.

8. An image pickup method of synthesizing a plurality of images with different exposures and that are obtained through bracketing, and of generating an image signal having a wide dynamic range, comprising:
calculating a plurality of exposures necessary for bracketing on the basis of shutter speeds;
determining whether or not respective shutter speeds corresponding to the plurality of exposures are equal to or higher than a threshold value, and permitting pickup of an image at an exposure when a shutter speed corresponding to that exposure is determined to be equal to or higher than the threshold value;
setting the number of images to be picked up at the exposure at which image pickup has been permitted in such a manner that the total number of images that have to be picked up to generate the image signal having a wide dynamic range using image signals obtained at the exposure at which image pickup has been permitted is a minimum;
obtaining the set number of image signals; and
synthesizing the plurality of obtained image signals so as to generate the image signal having a wide dynamic range.

9. An image pickup method of synthesizing a plurality of images with different exposures and that are obtained through bracketing, and of generating an image signal having a wide dynamic range, comprising:
calculating a plurality of exposures necessary for bracketing on the basis of shutter speeds;
setting the number of images to be picked up at each of the plurality of calculated exposures in such a manner that the total number of images that have to be picked up to generate the image signal having a wide dynamic range is a minimum;
obtaining the set number of images starting sequentially from a lowest exposure among the plurality of calculated exposures;
changing a current exposure to a lower exposure, changing the number of images to be picked up in such a manner that image signals at each calculated exposure can be obtained using an exposure after the change, and obtaining image signals again when camera shaking has been detected; and
synthesizing the plurality of obtained image signals so as to generate the image signal having a wide dynamic range.

* * * * *